(12) United States Patent
McNeill et al.

(10) Patent No.: US 9,259,642 B1
(45) Date of Patent: Feb. 16, 2016

(54) IN-GAME BUILDING THAT RECEIVES STAT BOOSTS FROM TROOPS

(71) Applicant: KABAM, INC., San Francisco, CA (US)

(72) Inventors: David McNeill, San Francisco, CA (US); Kevin Chanthasiriphan, San Francisco, CA (US); Bryan Tsao, San Carlos, CA (US); John Kim, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 176 days.

(21) Appl. No.: 14/019,477

(22) Filed: Sep. 5, 2013

(51) Int. Cl.
*A63F 13/10* (2006.01)
*A63F 13/00* (2014.01)

(52) U.S. Cl.
CPC ...................................... *A63F 13/00* (2013.01)

(58) Field of Classification Search
USPC ....................................................... 463/28, 31
See application file for complete search history.

(56) References Cited

U.S. PATENT DOCUMENTS

| | | | |
|---|---|---|---|
| 6,306,033 B1 | 10/2001 | Niwa et al. ...................... 463/1 |
| 8,651,961 B2* | 2/2014 | Muller ................... A63F 13/12 463/42 |
| 2012/0142429 A1* | 6/2012 | Muller ................... A63F 13/12 463/42 |
| 2012/0329556 A1 | 12/2012 | Eddy et al. ...................... 463/30 |
| 2013/0143669 A1* | 6/2013 | Muller ................... A63F 13/12 463/42 |
| 2014/0011595 A1* | 1/2014 | Muller ................... A63F 13/12 463/42 |

OTHER PUBLICATIONS

"Tesla trooper (Red Alert 2)", printed from URL http://cnc.wikia.com/wiki/Tesla_trooper_%28Red_Alert_2%29, printed on Sep. 5, 2013, 4 pages.
"Infantry Fighting Vehicle", printed from URL http://cnc.wikia.com/wiki/Infantry_Fighting_Vehicle, printed on Sep. 5, 2013, 4 pages.
"Bunker", printed from URL http://starcraft.wikia.com/wiki/Bunker, printed on Sep. 5, 2013, 5 pages.

* cited by examiner

*Primary Examiner* — Pierre E Elisca
(74) *Attorney, Agent, or Firm* — Sheppard Mullin Richter & Hampton LLP

(57) ABSTRACT

A system and method for garrisoning virtual units in virtual structures such that the attributes of the virtual structure are modified to reflect the garrisoning of the virtual unit inside the virtual structure.

16 Claims, 3 Drawing Sheets

IN-GAME BUILDING THAT RECEIVES STAT BOOSTS FROM TROOPS

FIELD OF THE DISCLOSURE

This disclosure relates to garrisoning virtual units in virtual structures and modifying the attributes of the virtual structure to reflect the garrisoning of the virtual unit in the virtual structure. The attributes of the virtual structure relate to combat characteristics of the virtual structure.

BACKGROUND

Garrisoning virtual units in virtual buildings in a game space is known; however, conventional systems do not modify the combat attributes of the virtual structure based on the virtual units garrisoned in the virtual structure.

SUMMARY

One aspect of the disclosure relates to a system configured to provide a game space, in accordance with one or more implementations. Users of game spaces may encounter combat scenarios. Users may control virtual units and virtual structures to engage in virtual combat. There may be differing types of virtual units and virtual structures in virtual combat scenarios. Upgrades to virtual units and virtual structures may be facilitated by using virtual units and virtual structures in conjunction with each other. In some implementations, the system may include one or more servers. The server(s) may be configured to communicate with one or more client computing platforms according to a client/server architecture. The users may access the system and/or the game spaces via the client computing platforms, in for instance, one or more games.

The server may be configured to execute one or more computer program modules. The computer program modules may include one or more of a game module, a virtual unit management module, a virtual structure management module, a shop module, a training module, and/or other modules.

The game module may be configured to execute an instance of a game space. The game module may be configured to implement the instance of the game space to facilitate participation by users in a game within the game space by determining view information from the instance and transmitting the view information to the client computing platforms associated with the users. The view information may facilitate the presentation of views of the game space to the users by the client computing platforms.

The virtual unit management module may be configured to manage a pool of virtual units that may be controlled by a user. The units in the pool may have individual attributes that may be managed by the virtual unit management module.

The virtual structure management module may be configured to manage a pool of virtual structures that may be controlled by a user. The structures in the pool may have individual attributes that may be managed by the virtual unit management module. Combat attributes of a virtual structure may be modified by a virtually garrisoning a virtual unit in a virtual structure.

The shop module may be configured to offer upgrades, units, structures, and/or other benefits in exchange for real currency, virtual currency, and/or other forms of payment.

The training module may be configured to allow a user to request upgrades, units, structures, and/or other benefits.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
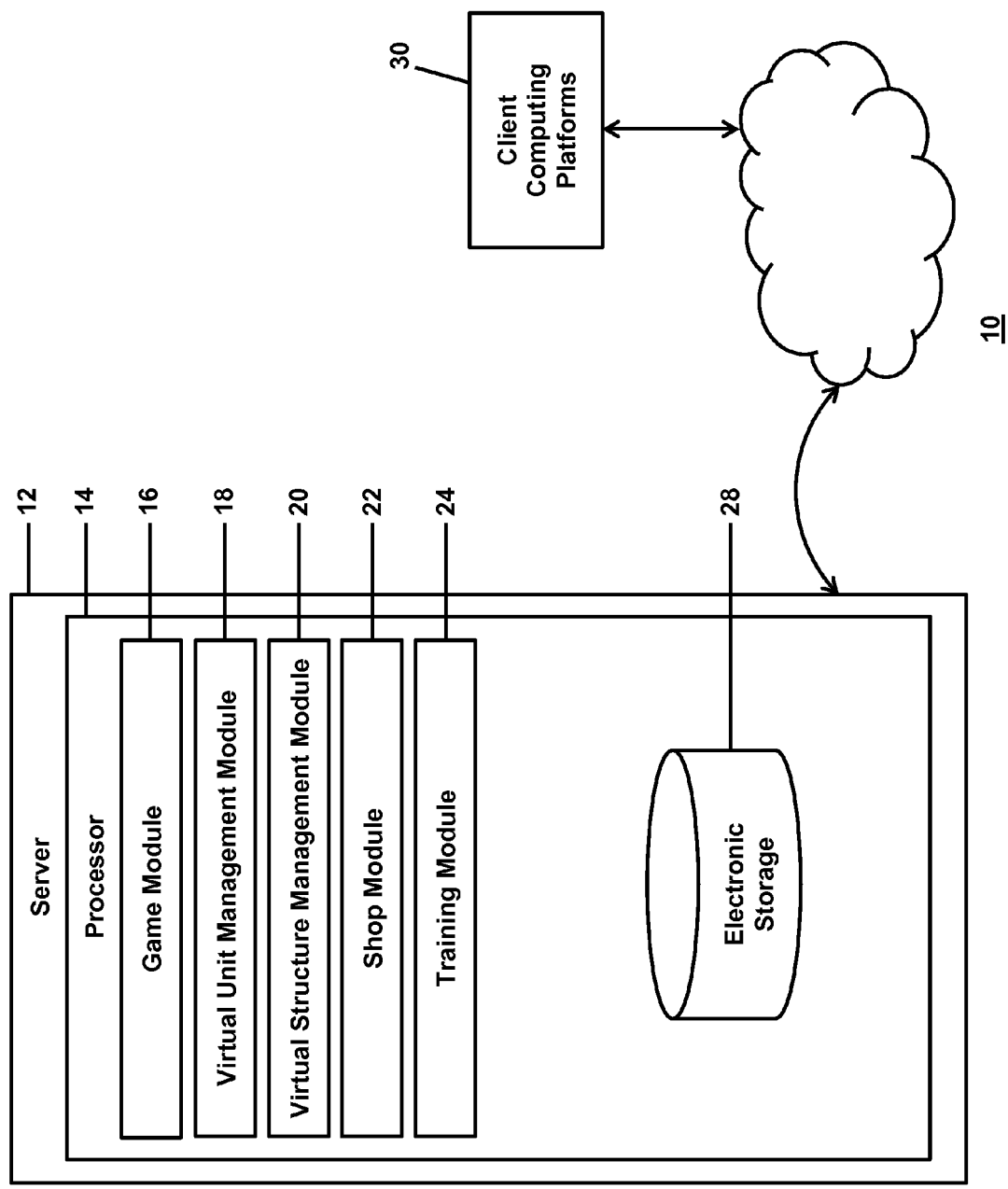
FIG. 1 illustrates a system configured to provide a game space, in accordance with one or more implementations.

FIG. 1 illustrates a system 10 configured to provide a game space to users. Providing the game space may include hosting the game space over a network. In some implementations, system 10 may include a server 12. Server 12 may be configured to communicate with one or more client computing platforms 30 according to a client/server architecture. Users may access system 10 and/or the game space via client computing platforms 30.

It should be appreciated that although modules 16, 18, 20, 22, and 24 are illustrated in FIG. 1 as being implemented within a single processing unit, in implementations in which processor 14 includes multiple processing units, one or more of modules 16, 18, 20, 22, and 24 may be implemented remotely from the other modules. In implementations in which processor 14 includes multiple processing units, one or more of modules 16, 18, 20, 22, and 24 may be implemented remotely from the other modules in various combinations. The description of the functionality provided by the different modules 16, 18, 20, 22, and 24 described below is for illustrative purposes, and is not intended to be limiting, as any of modules 16, 18, 20, 22, and 24 may provide more or less functionality than is described. For example, one or more of modules 16, 18, 20, 22, and 24 may be eliminated, and some or all of its functionality may be provided by other ones of modules 16, 18, 20, 22, and 24. As another example, processor 14 may be configured to execute one or more additional modules that may perform some or all of the functionality attributed below to one of modules 16, 18, 20, 22, and 24.

The server 12 may be configured to execute one or more computer program modules. The computer program modules may include one or more of a game module 16, virtual unit management module 18, virtual structure management module 20, shop module 22, training module 24, and/or other modules.

Game module 16 may be configured to implement an instance of the game space executed by the computer modules. In some cases, the instance of the game space may reflect the state of the game space. The instance of the game space may be used to push state information to clients (e.g., client computing platforms 30) for implementation on the client, may be used to verify state information generated on client executing expressions of the instance locally, and/or for other purposes. State information may include information about the state of the game space such as, without limitation, position information of one or more objects, topography information, object status/shape information, battle information, score information, user or character progress information, user inventory information, user or character resource information, progress information for one or more activities or actions, view information describing a view of the game space, and/or other information that describes the state of the game space. Expressions of the instance executed on the client facilitate presentation of views on the client of the game space. Expressions of the instance executed on the client may be configured to simply present views of the game space based on the state information (e.g., via streaming view information, object/position information, and/or other state information) received from game module 16. Expressions of the instance executed on the client may include space logic that effectively provides for execution of a limited version of the instance on a client that is synchronized and/or verified with state information received from game module 16. The view presented on a given client may correspond to a location in the game space (e.g., the location from which the view is taken, the location the view depicts, and/or other locations), a zoom ratio, a dimensionality of objects, a point-of-view, and/or view parameters. One or more of the view parameters may be selectable by the user.

The instance of the game space may comprise a simulated space that is accessible by users via clients that present the views of the game space to a user. The simulated game space may have a topography, express ongoing real-time interaction by one or more users, and/or include one or more objects positioned within the topography that are capable of locomotion within the topography. In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the game space may comprise one or more user achievements. In a game space such as an online game, a user achievement may comprise, for example, developing a skill, building, crafting, modifying, upgrading, trading, selling, and/or repairing an item, an equipment, a building, and/or a structure; training, building, modifying, healing, requesting, upgrading, selling, and/or repairing an in-game unit; harvesting, refining, trading, selling, developing, spending, and/or consuming an in-game resource; using, performing, developing, modifying, upgrading, and/or training a skill, ability, and/or attribute; completing in-game travel, reloading a weapon, receiving assistance such as a hint and/or a clue, defeating an enemy or enemies, rescuing an ally or allies, completing a mission or quest, and/or other actions. For example, in a game space involving building virtual structures, a user achievement may be associated with building, upgrading, and/or repairing a building or buildings. In an example involving a game space with an aspect related to the development of a character, a user achievement may be associated with using melee attack or a spell; interacting with another player and/or a non-player character; defeating an enemy or enemies; and/or rescuing an ally or allies. In an example involving a game space with an aspect related to the development of an army, a user achievement may be associated with winning a battle, developing an army to a certain size, and/or sustaining a minimal number of losses during a battle.

Within the instance of the game space executed by game module 16, users may control characters, objects, simulated physical phenomena (e.g., wind, rain, earthquakes, and/or other phenomena), and/or other elements within the game space to interact with the game space and/or each other. The user characters may include avatars. As used herein, the term "user character" may refer to an object (or group of objects) present in the game space that represents an individual user. The user character may be controlled by the user with which it is associated. The user controlled element(s) may move through and interact with the game space (e.g., non-user characters in the game space, other objects in the game space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game space.

Users may participate in an instance of a game space by controlling one or more of the available user controlled elements in the game space. Control may be exercised through control inputs and/or commands input by the users through client computing platforms 30. In some implementations user controlled elements may include units, structures, and/or other controllable elements. In some implementations, such as simulated battle, a user's goal may be to defeat an opposing force's units, structures, and/or other elements. In some implementations, units, structures, or units and structures may have combat attributes representative of a unit or structure's effectiveness in categories of attributes related to combat.

In a game space simulating combat, such as battle between two armies, units may be mobile elements able to traverse a game space battlefield. Units may be able to deal damage to an opposing force's units, structures, and/or other elements. Units may be able to sustain damage from an opposing force's units, structures, and/or other elements. Units may have a fixed or variable amount of life points representing their health. If a unit's life points are completely depleted, a unit may be destroyed. Units may be directed to perform tasks including moving, patrolling, attacking, defending, garrisoning, and/or other tasks. In some implementations a user may, for example, direct units to move from a user's base to an opposing force's base to attack the opposing force. In some implementations a user may, for example, station units in between an opposing force's base and a user's base to defend the user's base from the opposing force.

Units may include personnel, mechanical vehicles, and or other elements. Units may include non-combat units such as medics, workers, engineers, transports, and/or other non-combat units. Units may include combat units such as infantry, swordsmen, archers, riflemen, grenadiers, anti-aircraft infantry, heavy assault troopers, sappers, snipers, spies, special forces, heroes, cavalry, scouts, siege engines, anti-personnel vehicles, anti-armor vehicles, anti-aircraft vehicles, helicopters, fighter jets, aircraft interceptors, bombers, naval vessels, and/or other combat units. Both non-combat units and combat units may have combat attributes such as life points and/or the ability to deal damage to and opposing force's units, structures, and/or other elements.

In implementations where units are personnel, a user may train units from a game space barracks. In implementations where units are ground-based mechanized vehicles, a user may create units from a game space factory. In implementations where units are ships, a user may create units from a shipyard. In implementations where units are aircraft, a user may create units from an airfield.

In some implementations, units may have some artificial intelligence. Units may, for example, automatically attack an opposing force's units, structures, and/or other elements, when they are in the unit's attack range. Units may, for example, automatically move to attack an opposing force's units, structures, and/or other elements, when they enter the unit's sight range, but are not in the unit's attack range. Units may, for example, automatically heal allied units, structures, and/or other elements, when the allied units', structures', and/or other elements' health fall below a threshold. Units may, for example, automatically retreat from battle when their health falls below a threshold.

In some implementations a game space user may group units together and issue orders to every unit in the group at the same time. In some implementations, when grouped together, the units' artificial intelligence may automatically position the grouped units into a formation. In some implementations, the formation may be designed to impart a tactical advantage. In some implementations, the tactical advantage may include: arranging units able to sustain a large amount of damage at the front of the group; arranging units able to sustain a low amount of damage at the rear of the group; group; arranging units able to deal melee damage at the front of the group; arranging units able to deal ranged damage at the rear of the group; and/or other tactical arrangements.

In some implementations virtual units, structures, or units and structures have combat attributes that influence the effectiveness of their offensive and defensive capabilities in battle. Combat attributes may include melee attack damage, ranged attack damage, area of effect, damage over time, splash damage, modifier for biological target, modifier for mechanical target, armor points, damage against armor, speed, rate of fire, rate of rotation, range of sight, life points, shield points, rate of regeneration, range, damage for ground targets, damage for air targets, and/or other attributes.

Units, structures, and/or other user controllable elements may have differing combat attributes that make them effective against certain types of targets. For example, in some implementations, a particular unit may possess combat attributes that make it effective at combating infantry units. In some implementations, the unit may have attributes including, high damage to ground targets, low damages to air targets, low effectiveness against armored targets, low splash damage, low damage over time, low area of effect, high damage modifier for biological targets, high rate of rotation, high rate of fire, and/or other attributes.

A person of skill in the art appreciates that a unit, structure, and/or other element may have combat attributes tailored to the type of the respective unit, structure, and/or other element. For example, riflemen may have attributes making them effective at attacking infantry, anti-aircraft infantry may have attributes making them effective at attacking helicopters, grenadiers may have attributes making them effective at attacking mechanized vehicles, and sappers may have attributes making them effective at attacking structures.

In some implementations, a user may be able to control structures. User controlled structures may serve purposes such as generating units, bestowing special abilities, defending territory, and/or other purposes. In some implementations it may be a goal of a game to defend a position, structure, and/or other location. Users may, in some cases, use combat structures, non-combat structures, and/or other structures to achieve a goal of a game. In some instances, a user may use structures with an offensive capability to defend a location in a game. Structures with an offensive capability include, for example, guard posts, guard towers, sentry towers, keeps, pillboxes, anti-aircraft emplacements, artillery emplacements, and/or other combat structures. In some instances, a user may use structures without an offensive capability to defend a location in a game. Structures without an offensive capability include, for example, gates, fences, walls, barbed wire, bollards, watch towers, and/or other non-combat structures.

In some implementations, a user may garrison a unit in a structure to augment the combat attributes of a structure. Garrisoning a unit in a structure may, for example, grant the structure a form of attack, override a prior form of attack, modify the form of attack, modify the rate of fire, modify the range of sight, modify the strength of the structure, and/or modify other attributes. In some implementations, for example, garrisoning a unit in a structure may impart some of the offensive capabilities of the unit on the structure. In some instances, more than one unit may be garrisoned in a structure, and the combat attributes of the structure may reflect more than one unit garrisoned in the structure. In some instances, structures with offensive capabilities described above, may require units to be garrisoned in the structure before they take on offensive abilities. In some implementations, units may be garrisoned in structures without offensive capability. The described implementations are not intended to be limiting; other implementations are contemplated.

In some instances, garrisoning a unit in a structure may impart the offensive combat attributes of the unit on the structure. For example, garrisoning a unit in a structure without offensive capability such as a watch tower may give the watch tower some of the attributes of the unit. If, for example, a rifleman is garrisoned in a watch tower, the watch tower may be able to fire on infantry. In another example, if an anti-aircraft infantryman is garrisoned in the watch tower, the watch tower may be able to fire on aircraft. In some implementations, a unit may be garrisoned in a structure that already possesses an offensive capability. For example, in some implementations, a pillbox may be able to fire on ground based infantry units without having any units garrisoned in it. Garrisoning a rifleman in a pillbox may double the rate of fire of the pillbox on infantry. In another example, garrisoning anti-aircraft infantry in a pillbox may allow the pillbox to fire on infantry and aircraft. In some instances, structures with offensive capability, described above, may not possess offensive capability until a unit is garrisoned in the structure. For example, a pillbox may not have an offensive capability until a rifleman is garrisoned in the pillbox. In some instances, a structure will only allow certain units to garrison inside the structure. For example, a tank may not be allowed to garrison in a pillbox. In some implementations, garrisoning a soldier in a structure may grant defensive capabilities. For example, in some implementations, garrisoning a sapper in a structure may increase the resiliency of the structure to attack.

In some implementations, a user may garrison multiple units in a structure. Garrisoning multiple units in a structure may further enhance the combat attributes of a structure when compared on only garrisoning a single unit in the structure. In some implementations, garrisoning different types of units in a structure will allow the structure to take on different types of offensive capabilities. For example, in some implementations riflemen and anti-aircraft infantry may be garrisoned in the same pillbox. Garrisoning additional riflemen in the pillbox may increase the rate of anti-infantry fire. A person of skill in the art will appreciate that garrisoning multiple units may occur at the same time or may occur at different times.

In some implementations, there may be a limit to the extent to which units may be garrisoned in a structure. In some instances, for example, there may be a maximum number of units that may be garrisoned, a maximum type of a unit that may be garrisoned, a maximum benefit to the combat attributes of a structure, a maximum limit to the types of units that may be garrisoned, a maximum rate at which units may be garrisoned, a limitation on the time during which units may be garrisoned, a limitation on the times units may be garrisoned, a limitation on the types of units that may be garrisoned, and/or other limitations. For example, in some instances, a user may only garrison two units in a structure. In some instances, garrisoning a unit may void prior modifications to the combat attributes of a structure; overwrite existing offensive capabilities of a structure with offensive capabilities; or both. In some instances, for example, garrisoning anti-aircraft infantryman in a pillbox may prevent the pillbox from firing on infantry and only allow it to fire on aircraft.

In some implementations, garrisoning a unit may negatively affect the attributes of a structure. For example, garrisoning a unit in a supply depot may afford the supply depot offensive capabilities that it did not previously possess, but may simultaneously lower the amount of supplies that the supply depot can provide. In some implementations, garrisoning a unit may negatively affect the attributes of a unit that may be imparted on the structure. For example, the amount of damage dealt by a structure with a rifleman garrisoned in the structure may be less than the amount of damage that would be dealt by the rifleman had it not been garrisoned in the structure.

A person of skill in the art appreciates that in some implementations, virtual units have fewer life points than structures. In some implementations, virtual structures generally do not have the ability to attack units or structures. By garrisoning a unit in a structure, a user may create a structure with an offensive ability and a large amount of life points.

In some implementations, garrisoning a unit in a structure may be permanent. In these implementations, once a unit is garrisoned in a structure, the unit may not be removed from the structure. In some implementations, apart from losing a unit in battle, garrisoning a unit may be the only way to remove a unit from the control of a user. In some instances, garrisoning units may be a method of regulating the size of a user's army. For example, in some instances, troops may need to be continually garrisoned in structures to maintain the offensive capability of a structure, or to repair the health of a structure. In such cases, a user's army may be prevented from growing too large because a user must devote a portion of the controlled units to being garrisoned in structures.

In some implementations, a graphic representing a structure with a garrisoned soldier may be modified to reflect the garrisoned soldier. In some implementations, a graphic representing a garrisoned structure may be modified to reflect the modified combat attributes of the structure.

In some implementations, users may purchase units, structures, and/or other elements using real currency, virtual currency, virtual resources, and/or other resources. In a game space, virtual resources may be virtual commodities. Users may acquire resources, spend resources, trade resources, invest resources, consume resources, harvest resources, loot resources, transform resources, and/or perform other tasks relating to virtual resources. Virtual resources may include, for example, minerals, gas, gold, currency, metal, parts, ammunition, energy, and/or other virtual resources.

In some implementations, a user may harvest a mineral resource from a battlefield by using worker units to retrieve the mineral from a mine and depositing it in a refinery structure. In some implementations, a user may harvest a gas resource from a battlefield by using worker units to retrieve the gas from a well and depositing it in a refinery structure. In some implementations, a user may loot a mineral resource from a destroyed worker unit of an opposing force. In some implementations, a user may transform a harvested metal resource into a part resource.

In some implementations a user may exchange minerals, gas, and/or other virtual resources for units, structures, and/or other elements. In some implementations a user may exchange minerals, gas, and/or other virtual resources for other types of resources. In some implementations the act of garrisoning a unit in a structure requires spending virtual resources. In some implementations, the operation of a structure, unit, and/or other element requires spending virtual resources.

In some implementations, users may interact with each other through communications exchanged within the game space. Such communications may include one or more of textual chat, instant messages, private messages, voice communications, and/or other communications. Communications may be received and entered by the users via their respective client computing platforms 30. Communications may be routed to and from the appropriate users through server 12 (e.g., through game module 16).

The above description of the views of the game space determined from the instance executed by game module 16 is not intended to be limiting. The game space may be presented in a more limited, or more rich, manner. For example, views of the game space may be selected from a limited set of graphics depicting an event in a given place within the game space. The views may include additional content (e.g., text, audio, pre-stored video content, and/or other content) that describes particulars of the current state of the place, beyond the limited set of graphics. For example, a view may include a generic battle graphic with a textual description of the opponents to be confronted. Other representations of individual places within the game space are contemplated.

Virtual unit management module 18 may be configured to manage a pool of units that may be controlled by a user, as well as the attributes of the units. In some implementations, managing a pool of units under the control of a user may include tracking units as they are created, tracking units as they are trained, tracking units as they are deployed, tracking units as they are destroyed, tracking units as leave a battle, tracking units as they are garrisoned, and/or tracking other unit activities. In some implementations, managing the attributes of units under the control of a user may include tracking units as they are healed, tracking units as they are damaged, tracking units as they are repaired, tracking units as they are upgraded, and/or tracking other unit activities.

In some implementations, virtual unit management module 18 may be configured to remove units from a user's pool of units when the units are garrisoned into a structure. In instances where garrisoning units in a structure is permanent, virtual unit management module 18 may be configured to prevent a garrisoned unit from coming into the control of a user after it is garrisoned.

Virtual structure management module 20 may be configured to manage a pool of structures that may be controlled by a user, as well as the attributes of the structures. In some implementations, managing a pool of structures under the control of a user may include tracking structures as they are created, tracking structures as they are deployed, tracking structures as they are destroyed, tracking structures as units are garrisoned in the structures, and/or tracking other structure activities. In some implementations, managing the attributes of structures under the control of a user may include tracking structures as they are damaged, tracking structures as they are repaired, tracking structures as they are upgraded, and/or tracking other structure activities.

In some implementations, virtual structure management module 20 may be configured to modify attributes of a structure in response to a unit garrisoning in a structure. In some instances, virtual structure management module 20 may be further configured to modify art representing a structure with garrisoned units.

Shop module 22 may be configured to allow a user to purchase upgrades or in-game benefits in exchange for real currency, virtual currency, virtual resources, and/or other resources. Upgrades may include upgrades for units, upgrades for structures, and/or other upgrades. In some implementations, upgrades may include removing limitations on garrisoning units in structures. For example, in some implementations a user may be able to increase a maximum number of units that may be garrisoned, increase a maximum number of a type of unit that may be garrisoned, increase a maximum benefit to the combat attributes of a structure, increase maximum limit to the types of units that may be garrisoned, increase a maximum rate at which units may be garrisoned, remove a limitation on the time during which units may be garrisoned, remove a limitation on the times units may be garrisoned, remove a limitation on the types of units that may be garrisoned, and/or remove other limitations. A person of skill in the art appreciates that the exemplary limitations may be limitations for a particular structure, type of structure, user, team, guild, and/or other bases of implementing limitations. A person of skill in the art appreciates that removing limitations may be done in relation to a particular structure, type of structure, user, team, guild, and/or other bases of implementing limitations.

Training module 24 may be configured to generate units for a user to control. In some implementations, training module 24 may be configured to create units for a user without a request by the user. In some implementations, training module 24 may be configured to create units for a user to control in response to a request by a user. In some instances, there may be a delay between the receipt of a user's request and the time that the unit is created. In some instances, the time it takes to deliver a unit may depend on a value of the unit. In some implementations, units may be requested in exchange for real currency, virtual currency, virtual resources, and/or other resources.

In some implementations, the server 12 and client computing platforms 30 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12 and client computing platforms 30 may be operatively linked via some other communication media.

A given client computing platform 30 may include one or more processors configured to execute computer program modules. The computer program modules may be configured to enable an expert or user associated with the given client computing platform 30 to interface with server 12, and/or provide other functionality attributed herein to client computing platforms 30. By way of non-limiting example, the given client computing platform 30 may include one or more of a desktop computer, a laptop computer, a handheld computer, a tablet computing platform, a NetBook, a Smartphone, a gaming console, and/or other computing platforms.

Server 12 may include electronic storage 28, one or more processors 14, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 28 may comprise non-transitory storage media that electronically stores information. The electronic storage media of electronic storage 28 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 14, information received from server 12, information received from client computing platforms 30, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include a plurality of processing units. These processing units may be physically located within the same device, or processor 14 may represent processing functionality of a plurality of devices operating in coordination. The processor 14 may be configured to execute modules 16, 18, 20, 22, and 24. Processor 14 may be configured to execute modules 16, 18, 20, 22, and 24 by software; hardware; firmware; some combination of software, hardware, and/or firmware; and/or other mechanisms for configuring processing capabilities on processor 14. As used herein, the term "module" may refer to any component or set of components that perform the functionality attributed to the module. This may include one or more physical processors during execution of processor readable instructions, the processor readable instructions, circuitry, hardware, storage media, or any other components.

Figure 2:
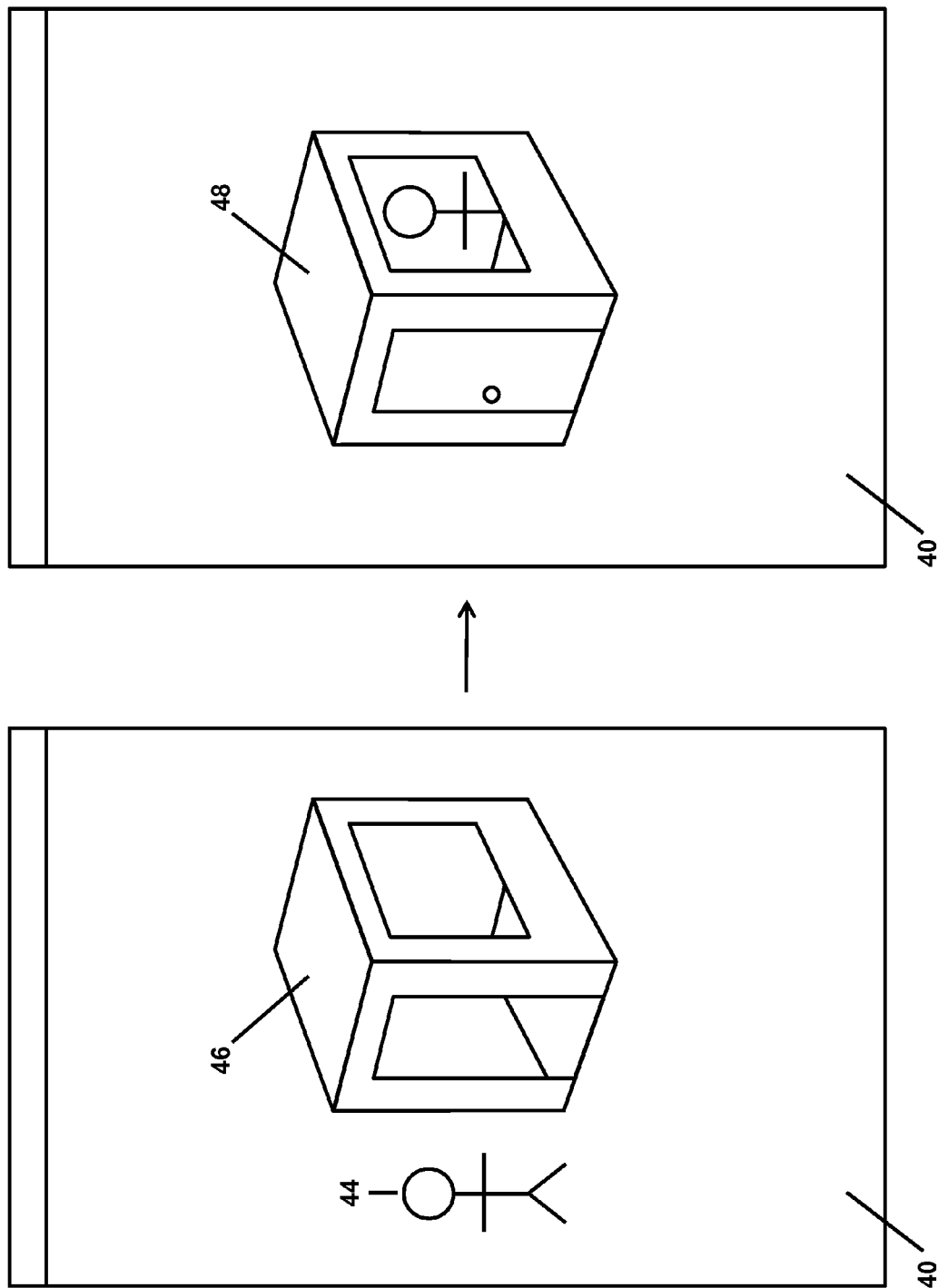
FIG. 2 illustrates an instance of an overview of the garrisoning process.

FIG. 2 illustrates an overview of an instance of the garrisoning process. A user of a game space may be presented with a game space interface. The game space interface may be configured to display a game space 40. Game space 40 may show a unit 44 and a structure 46. A user may garrison unit 44 in structure 46. Game space 40 may reflect a garrisoned structure 48 in response to garrisoning unit 44 in structure 46.

Figure 3:
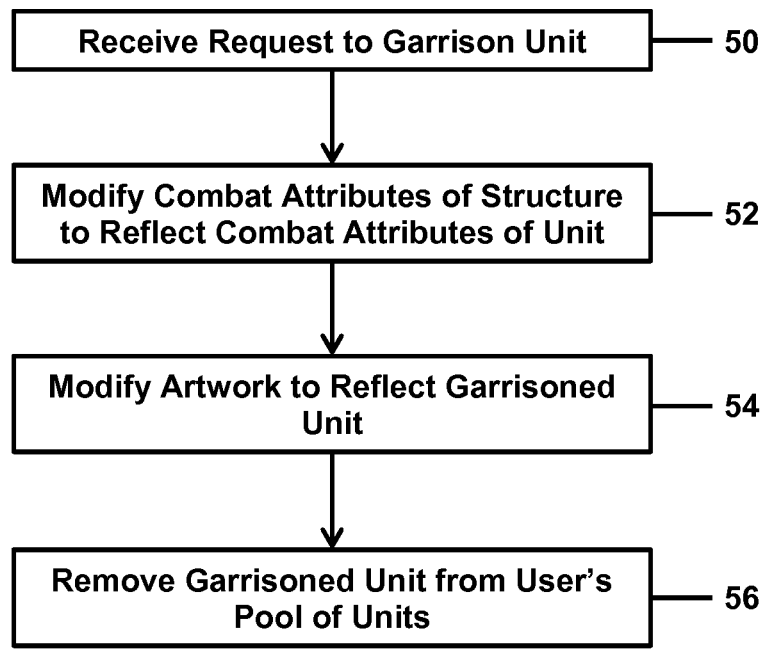
FIG. 3 illustrates a method of garrisoning a virtual unit in a virtual structure.

FIG. 3 illustrates a method 60 of modifying combat attributes of a virtual structure in response to garrisoning a virtual unit in the virtual structure. The operations of method 60 presented below are intended to be illustrative. In some implementations, the method 60 may be accomplished with one or more additional operations not described, and/or without one or more of the operations discussed. Additionally, the order in which the operations of method 60 are illustrated in FIG. 3 and described below are not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 50, a request to garrison a unit in a structure may be received. Operation 50 may be performed by a game module that is the same as or similar to game module 16, in accordance with one or more implementation.

At an operation 52, combat attributes of a structure may be modified to reflect combat attributes of a unit to be garrisoned in a structure. Operation 52 may be performed by a virtual structure management module that is the same as or similar to virtual structure management module 20, in accordance with one or more implementation.

At an operation 54, art reflecting a structure may be modified to show that a unit is garrisoned in the structure. Operation 54 may be performed by a virtual structure management module that is the same as or similar to virtual structure management module 20, in accordance with one or more implementation.

At an operation 56, a unit garrisoned in a structure may be removed from a pool of units associated with a user. Operation 56 may be performed by a virtual unit management module that is the same as or similar to virtual unit management module 18, in accordance with one or more implementation.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for modifying attributes of a game space, the system comprising:
    one or more processors configured by machine-readable instructions to:
        execute an instance of a game space, and to use the instance to effectuate transmission over a network of game state information derived from the instance of the online game to facilitate presentation of views of the game to users on client computing platforms associated with the users, wherein the game space is configured to facilitate interaction of the users with virtual structures and units;
        manage a virtual unit associated with a user;
        manage a virtual structure associated with the user and combat attributes of the virtual structure;
        modify the combat attributes of the virtual structure in response to virtually garrisoning a virtual unit in the virtual structure; and
        remove a virtual unit from a pool of virtual units associated with a user in response to virtually garrisoning a virtual unit in the virtual structure.

2. A system of claim 1, wherein the modification of the combat attributes of the virtual structure is based on the virtual unit garrisoned in the virtual structure.

3. A system of claim 1, wherein the one or more processors are further configured by machine-readable instructions to allow a user to purchase upgrades for virtual units, structures, or units and structures, wherein upgrades modify attributes associated with the virtual unit, structure, or unit and structure being upgraded.

4. A system of claim 1, wherein an image representing a virtual structure changes to reflect the modified combat attributes of the virtual structure.

5. A system of claim 1, wherein the one or more processors are further configured by machine-readable instructions to generate virtual units, structures, or units and structures.

6. A system of claim 1, wherein a modification of attributes associated with garrisoning a virtual unit in a virtual structure cannot be reversed.

7. A system of claim 1, wherein the combat attributes are at least one of: damage, type of damage, rate of fire, or range of sight.

8. A system of claim 1, wherein virtual units may, when not garrisoned in a virtual structure, be deployed to battle opposing forces or positioned to defend a location, or both.

9. A computer implemented method for modifying combat attributes of a virtual structure in a game space, the method being implemented in a computer system that includes one or more processors configured by machine-readable instructions, the method comprising:
    executing an instance of a game space, and using the instance to effectuate transmission over a network of game state information derived from the instance of the game to facilitate presentation of views of the online game to users on client computing platforms associated with the users, wherein the game space facilitates interaction of the users with the game spaces in response to commands received from the users;
    receiving a request over a network from a client computing platform associated with a user to garrison a virtual unit in a virtual structure;
    modifying a combat attribute of the virtual structure in response to the request to virtually garrison the virtual unit; and
    removing the virtual unit from a pool of virtual units associated with the user in response to virtually garrisoning a virtual unit in the virtual structure.

10. A method of claim 9, wherein modifying the combat attributes of the virtual structure is based on the virtual unit garrisoned in the virtual structure.

11. A system of claim 9, further comprising allowing allow a user to purchase upgrades for virtual units, structures, or units and structures, wherein upgrades modify attributes associated with the virtual unit, structure, or unit and structure being upgraded.

12. A method of claim 9, further comprising changing an image representing a virtual structure to reflect the modified combat attributes of the virtual structure.

13. A method of claim 9, further comprising generating virtual units, structures, or units and structures.

14. A method of claim 9, wherein modifying attributes associated with garrisoning a virtual unit in a virtual structure cannot be reversed.

15. A method of claim 9, wherein the combat attributes are at least one of: damage, type of damage, rate of fire, or range of sight.

16. A method of claim 9, wherein virtual units may, when not garrisoned in a virtual structure, be deployed to battle opposing forces or positioned to defend a location, or both.

* * * * *